United States Patent
Take et al.

(10) Patent No.: US 9,710,174 B2
(45) Date of Patent: Jul. 18, 2017

(54) SEMICONDUCTOR DEVICE

(71) Applicant: Renesas Electronics Corporation, Kawasaki-shi (JP)

(72) Inventors: Yukiko Take, Kawasaki (JP); Shinya Izumi, Kawasaki (JP); Tetsuichiro Ichiguchi, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 98 days.

(21) Appl. No.: 14/633,061

(22) Filed: Feb. 26, 2015

(65) Prior Publication Data

US 2015/0248246 A1     Sep. 3, 2015

(30) Foreign Application Priority Data

Feb. 28, 2014   (JP) .................................. 2014-038799

(51) Int. Cl.
*G06F 3/06*     (2006.01)
*G06F 11/22*    (2006.01)

(52) U.S. Cl.
CPC .......... *G06F 3/0616* (2013.01); *G06F 3/0659* (2013.01); *G06F 3/0679* (2013.01); *G06F 11/2221* (2013.01); *G06F 2206/1014* (2013.01)

(58) Field of Classification Search
CPC ......... G06F 11/2221; G06F 2206/1014; G06F 3/0616; G06F 3/06; G06F 12/0246; G06F 3/0679; G06F 2212/2022; G06F 2212/7211; G11C 16/102
See application file for complete search history.

(56) References Cited

U.S. PATENT DOCUMENTS 5,388,247 A * 2/1995 Goodwin ................ G06F 9/383
                                                            711/136
5,461,718 A * 10/1995 Tatosian .............. G06F 12/0862
                                                            711/157
(Continued)

FOREIGN PATENT DOCUMENTS

| JP | 2001-148199 A | 5/2001 |
| JP | 2007-034554 A | 2/2007 |
| JP | 2009-252026 A | 10/2009 |

OTHER PUBLICATIONS

Extended European Search Report dated Jun. 25, 2015.
Japanese Office Action dated May 9, 2017, with an English translation.

*Primary Examiner* — Mano Padmanabhan
*Assistant Examiner* — Jean Edouard
(74) *Attorney, Agent, or Firm* — McGinn IP Law Group, PLLC

(57) ABSTRACT

In semiconductor devices with nonvolatile memory modules embedded therein, a technology is provided which facilitates evaluation of the nonvolatile memory characteristics. An MCU includes a CPU, a flash memory, and an FPCC that controls write or erase operations to the flash memory. The FPCC executes a program used to perform write or other operations to the flash memory, thereby performing write or other operations to the flash memory in accordance with a command issued by the CPU. In the MCU, the FCU is configured to execute test firmware to evaluate the flash memory. In addition, a RAM can be used by both the CPU and FCU.

5 Claims, 9 Drawing Sheets

(56) References Cited

U.S. PATENT DOCUMENTS

| | | | |
|---|---|---|---|
| 5,687,345 A * | 11/1997 | Matsubara | G06F 9/445 257/E21.683 |
| 6,538,924 B2 * | 3/2003 | Dono | G11C 14/00 365/185.08 |
| 6,993,696 B1 | 1/2006 | Tanizaki et al. | |
| 7,821,916 B2 | 10/2010 | Yousef | |
| 2002/0059515 A1 * | 5/2002 | Hagiwara | G06F 3/0614 713/100 |
| 2002/0089883 A1 * | 7/2002 | Pepi | F02D 41/2422 365/200 |
| 2002/0162075 A1 | 10/2002 | Talagala et al. | |
| 2005/0060603 A1 | 3/2005 | Pomaranski et al. | |
| 2008/0022154 A1 | 1/2008 | Endou | |
| 2009/0113119 A1 * | 4/2009 | Oribe | G06F 12/0804 711/103 |
| 2009/0198879 A1 * | 8/2009 | Tanaka | G06F 13/1673 711/103 |
| 2010/0322024 A1 * | 12/2010 | Yagishita | G11C 29/24 365/200 |
| 2012/0254663 A1 * | 10/2012 | Nakano | G11C 29/02 714/32 |
| 2013/0159814 A1 * | 6/2013 | Hashimoto | G11C 29/04 714/773 |
| 2013/0250643 A1 * | 9/2013 | Matsunaga | G11C 8/12 365/63 |
| 2014/0281154 A1 * | 9/2014 | Hashimoto | G11C 29/1201 711/103 |

\* cited by examiner

| PROGRAM | User Program | Test firm | R/W/E |
|---|---|---|---|
| MAIN PROGRAM-EXECUTING UNIT | CPU | FPCC | FPCC |

| PROGRAM | User Program | Test firm | R/W/E |
|---|---|---|---|
| MAIN PROGRAM-EXECUTING UNIT | CPU | FCPU | FPCC |

| PROGRAM | User Program | Test firm | R/W/E |
|---|---|---|---|
| MAIN PROGRAM-EXECUTING UNIT | CPU | FCPU | FPCC |

| PROGRAM | User Program | Test firm | R/W/E |
|---|---|---|---|
| MAIN PROGRAM-EXECUTING UNIT | CPU | FPCC | FPCC |

| PROGRAM | User Program | Test firm | R/W/E |
|---|---|---|---|
| MAIN PROGRAM-EXECUTING UNIT | CPU | FPCC | FPCC |

| PROGRAM | User Program | Test firm | R/W/E |
|---|---|---|---|
| MAIN PROGRAM-EXECUTING UNIT | CPU | FCPU | FPCC |

FIG. 16

| PROGRAM | User Program | Test firm | R/W/E |
|---|---|---|---|
| MAIN PROGRAM-EXECUTING UNIT | CPU | FCPU | FPCC |

# SEMICONDUCTOR DEVICE

CROSS-REFERENCE TO RELATED APPLICATIONS

The disclosure of Japanese Patent Application No. 2014-038799 filed on Feb. 28, 2014 including the specification, drawings and abstract is incorporated herein by reference in its entirety.

BACKGROUND

This disclosure relates to a semiconductor device provided with a rewritable nonvolatile memory module, and more particularly, to a technology for facilitating evaluation of nonvolatile memory characteristics.

Semiconductor devices, such as microcontrollers, are used to control various types of electronic equipment and are employed in various products. Some semiconductor devices are provided with a rewritable nonvolatile memory, such as a flash memory. Reading data from, writing data to, and erasing data of the flash memory are performed in accordance with instructions from a processor. The miniaturization of semiconductor devices has complicated the control of write and erase operations to the flash memory. Therefore, evaluation of flash memory characteristics is essential at a prototyping stage of the flash memory, at a development stage of a micro control unit (MCU) with an internal flash memory, and at a manufacturing stage of these devices.

A technology for evaluating the characteristics of nonvolatile storage devices, like the flash memory, is disclosed in, for example, Japanese Unexamined Patent Application Publication No. 2007-34554 (Patent Document 1). The technology disclosed in Patent Document 1 relates to a semiconductor integrated circuit including a writable and erasable nonvolatile memory module and a central processing unit (CPU). According to the technology disclosed in Patent Document 1, the semiconductor integrated circuit has a first operation mode and a second operation mode. In the first operation mode, the CPU sequentially executes instructions to control write and erase operations to the nonvolatile memory module. In the second operation mode, a local CPU responds to a command issued by the CPU and sequentially executes instructions to control write and erase operations to the nonvolatile memory module. In normal operation of the semiconductor integrated circuit, the second operation mode allows the CPU to execute other processing tasks while the local CPU is performing write operation or other operations to the nonvolatile memory module, thereby achieving real-time processing. When the semiconductor integrated circuit conducts a test on the nonvolatile memory module, the semiconductor integrated circuit can select either of the first operation mode and second operation mode.

SUMMARY

In the technology disclosed in Patent Document 1, when a control operation that is normally not disclosed is performed to conduct a test of the nonvolatile memory module, the local CPU cannot access data in the memory module. To conduct the test, various settings are stored in a random access memory (RAM), which is accessible from the CPU, before the test. A user selects the first operation mode to store programs to be run by the CPU and various settings used to evaluate the nonvolatile memory module in the RAM, to replace the programs, and to evaluate the nonvolatile memory module in terms of a plurality of test items.

However, since the CPU is the one that executes a test program to evaluate the nonvolatile memory module according to the technology disclosed in Patent Document 1, the test program is required to be developed in accordance with the CPU.

In addition, since the test for the nonvolatile memory module is complicated, development of the test program is necessary, for example, every time an MCU including a nonvolatile memory module is developed, resulting in an increase in development costs. In this circumstance, technology for facilitating evaluation of the nonvolatile memory module characteristics is in demand.

The other problems and novel features of the present invention will become apparent from the following description in the present specification and the accompanying drawings.

A semiconductor device according to an embodiment includes a main processor, a rewritable nonvolatile memory, and a memory controller that controls write and erase operations to the nonvolatile memory. The memory controller stores a control program used to perform read/write/erase operations to the nonvolatile memory and executes the control program to perform the read/write/erase operations to the nonvolatile memory in accordance with a command issued from the main processor. The semiconductor device is configured so that the memory controller executes test firmware for evaluating the nonvolatile memory.

The semiconductor device according to the embodiment, which is configured to include the CPU, rewritable nonvolatile memory module, and controller for the nonvolatile memory module, allows the controller of the nonvolatile memory module to execute the test firmware, thereby enabling development of CPU-independent test firmware. Such test firmware can be more easily developed in comparison with development of CPU-dependent test firmware.

BRIEF DESCRIPTION OF THE DRAWINGS

FIG. 16 indicates main units that execute respective programs.

DETAILED DESCRIPTION

Figures 1, 2:
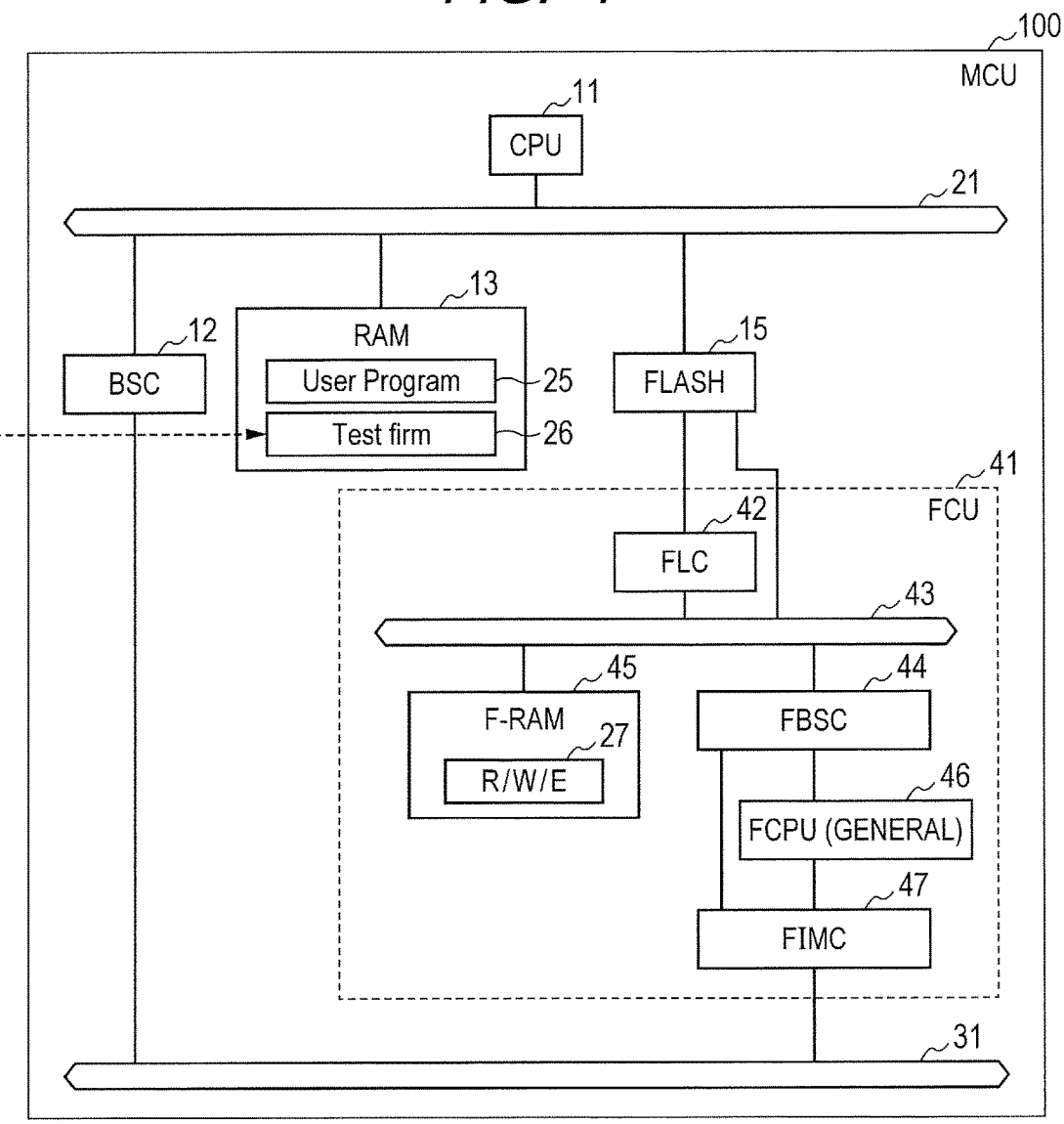
FIG. 1 is a block diagram showing the configuration of an MCU 100 which is a semiconductor device of the related art.
FIG. 2 indicates main units that execute respective programs.

With reference to the accompanying drawings, embodiments of the semiconductor device according to the present disclosure will be described below. Through the descriptions, the same components are designated with the same reference numerals. The name and functions of those are also the same, and therefore their detailed descriptions will not be reiterated.

Related Art

For comparison with the semiconductor devices of the embodiments, the related art technology will be described. FIG. 1 is a block diagram showing the configuration of an MCU 100 which is a semiconductor device of the related art. The MCU 100 of the related art is a system with a rewritable nonvolatile memory (flash memory) embedded therein. As shown in FIG. 1, the MCU 100 of the related art includes a CPU 11, a bus state controller (BSC) 12, a RAM 13, a flash memory 15, and a FCU 41. The FCU 41 includes a flash write control circuit (FLC) 42, a local bus controller (FBSC) 44, a flash RAM (F-RAM) 45, a local CPU (FCPU) 46, and a CPU interface controller (FIMC) 47.

The CPU 11 is a processor that controls the operation of the MCU 100.

The BSC 12 couples an internal bus 21 and a peripheral bus 31 to permit respective modules coupled to the peripheral bus 31 to access the CPU 11.

The RAM 13 is a rewritable volatile memory that is accessed from the CPU 11 via the internal bus 21. In the MCU 100 of the related art, the RAM 13 is disposed outside the FCU 41 and stores a user program 25 and test firmware 26. The FCU 41 cannot make access to the RAM 13. The user program 25 is any program created by a user. The test firmware 26 is used to evaluate the characteristics of the flash memory 15. Various pieces of setting information used to test the flash memory 15 are stored in the RAM 13, and the CPU 11 reads the test firmware 26 from the RAM 13 to evaluate various characteristics of the flash memory 15.

The flash memory 15 is a nonvolatile memory. For example, the flash memory 15 stores programs used to operate the CPU 11, data to be maintained in a nonvolatile manner, and other types of information and data. The flash memory 15 includes a large number of electrically erasable and writable nonvolatile memory transistors.

The FCU 41 performs read/write/erase operations to the flash memory 15 in accordance with commands issued from the CPU 11. The CPU 11 is coupled to the FCU 41 via the internal bus 21 and peripheral bus 31.

The FLC 42 has a register used to control rewrite operations to the flash memory 15. For example, the FLC 42 sets the operation mode of the MCU 100 ("normal operation mode" in which the MCU 100 operates in accordance with the user program, "test mode" to evaluate the characteristics of the flash memory 15, etc.) based on results of voltage level adjustment of pulse voltage used to write the flash memory 15, pulse voltage used to erase the flash memory 15, drain voltage, source voltage, and so on.

The FBSC 44 is a controller that controls a local bus 43. The local bus 43 is coupled to the flash memory 15, FLC 42, and other components.

The F-RAM 45 is embedded in the FCU 41. When the MCU 100 operates in normal operation mode, a part of a storage region of the F-RAM 45 is protected from access by the CPU 11. The F-RAM 45 stores a flash control program 27 used by a FCPU 46 to write/read/erase the flash memory 15.

The FCPU 46 is a processor that controls the operation of the FCU 41. Commands issued by the CPU 11 are translated by an FIMC 47. The FCPU 46 can be implemented by a general-purpose processor. The FCPU 46 reads the flash control program 27 from the F-RAM 45 and executes it to make access to the flash memory 15 in accordance with a command issued by the CPU 11.

The FIMC 47 coupled to the peripheral bus 31 activates the FCPU 46 in response to access by the CPU 11. With a command issued by the FIMC 47 to the FBSC 44, control over the F-RAM 45, FLC 42 and other components through the local bus 43 is exercised.

In the MCU 100 of the related art, the storage region of the RAM 13 includes at least a part that permits access from the CPU 11, but not from the FCPU 46, and the part can store settings necessary for a test of the flash memory 15 to conduct the test on the flash memory 15. When a user performs an operation that should be concealed on the flash memory 15, the user stores the test firmware 26 in the RAM 13 and executes the test firmware 26 with the CPU 11 to evaluate the characteristics of the flash memory 15. The user replaces the programs to be stored in the RAM 13 to evaluate the characteristics of the flash memory 15.

In this configuration of the related art, the main unit that executes the test firmware 26 is the CPU 11, and therefore the program developers are required to develop the test firmware 26 so as to meet the specifications of the CPU 11. In addition, since the test firmware 26 is a result of the accumulation of know-how, it is desirable to make the analysis of the test firmware 26 difficult, while making it possible to evaluate the characteristics of the flash memory 15.

FIG. 2 indicates main units that execute respective programs. As shown in FIG. 2, the CPU 11 reads and executes the user program 25 in the normal operation mode, while reading and executing the test firmware 26 in the test mode. In addition, the FCPU 46 reads and executes the flash control program 27 to make access to the flash memory 15.

Contrary to the semiconductor device of the related art, a semiconductor device according to the first embodiment, which will be described below, enables development of the test firmware 26 without dependence on the CPU 11 by setting the FCU 41 as a main unit that executes the test firmware 26. This facilitates development of the test firmware 26.

First Embodiment

Figures 3, 4:
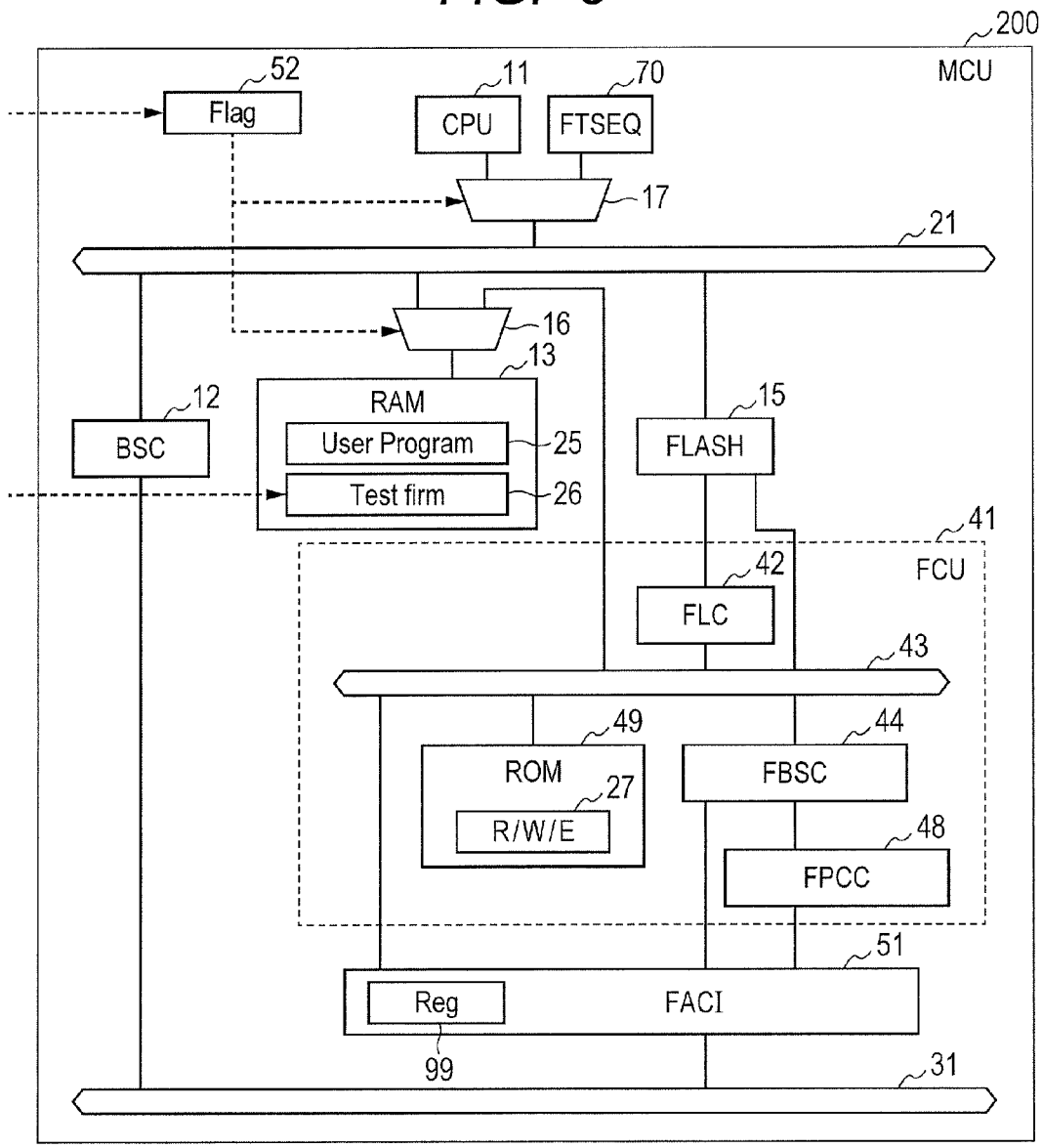
FIG. 3 is a block diagram showing the configuration of an MCU 200 which is a semiconductor device of the first embodiment.
FIG. 4 indicates main units that execute respective programs.

Referring to FIGS. 3 and 4, a semiconductor device of the first embodiment will be described. FIG. 3 is a block diagram showing the configuration of an MCU 200 which is a semiconductor device of the first embodiment.

As shown in FIG. 3, the MCU 200 includes a CPU 11, a BSC 12, a RAM 13, a flash memory 15, a multiplexer 16, a multiplexer 17, an FCU 41, a flash application command interface (FACI) 51, and a flash test sequencer (FTSEQ) 70. The FCU 41 includes an FLC 42, an FBSC 44, a flash program customized control (FPCC) 48, and a ROM 49.

The FACI 51 is a module serving as an interface between the CPU 11 and FCU 41. Commands issued by the CPU 11 to the FCU 41 are output to the FACI 51 via an internal bus 21 and peripheral bus 31. The FACI 51 receives the commands from the CPU 11, and issues them to the FPCC 48 to meet the specifications of the FPCC 48. The specifications of the commands issued by the CPU 11 to the FCU 41 sometimes depend on the specifications of the MCU 200; however, the FACI 51 absorbs the difference between the specifications and issues the commands to the FPCC 48. The FACI 51 is provided with a Reg 99 that is controllable through a local bus 43 only in test mode. The Reg 99 includes various kinds of setting registers required to rewrite the flash memory 15, and other components. In the test mode, the FPCC 48 sets the Reg 99 to any level in order to execute various tests.

A flag 52 is used to manage whether the MCU 200 is operating in normal operation mode or in test mode. The flag 52 can be set by an external device. The MCU 200 outputs a signal to the multiplexer 16 and multiplexer 17 in accordance with the setting of the flag 52 to change the target that the multiplexer 16 and multiplexer 17 should couple to.

The test sequencer 70 is a sequencer dedicated for a test to evaluate the characteristics of the flash memory 15. The test sequencer 70 is activated when the MCU 200 operates in test mode and issues a command to the FPCC 48 via the internal bus 21 and peripheral bus 31. The multiplexer 17 couples one of the CPU 11 and test sequencer 70 to the internal bus 21. When the MCU 200 operates in normal operation mode, the multiplexer 17 couples the CPU 11 to the internal bus 21. When the MCU 200 operates in test mode, the multiplexer 17 couples to the test sequencer 70 and the internal bus 21. After detecting that the FPCC 48 has completed the command, the test sequencer 70 outputs the detected results to an external device.

In comparison with the MCU 100 of the related art, the FCU 41 in the MCU 200 of the first embodiment includes the FPCC 48 instead of the FCPU 46. Also a flash control program 27 is stored in the ROM 49. The FPCC 48 is a controller that controls write and erase operations to the flash memory 15. The FPCC 48 acquires instructions from the flash control program 27 stored in the ROM 49 and sequentially executes the instructions to perform write and erase operations to the flash memory 15. When the MCU 200 operates in normal operation mode, the flash memory 15 is written or is subjected to other operations in accordance with the command issued by the CPU 11.

In comparison with the MCU 100 of the related art, the MCU 200 of the first embodiment includes the multiplexer 16 that allows the CPU 11 and FCU 41 to couple to the RAM 13. In other words, the MCU 200 is configured so that the RAM. 13, which is a general-purpose volatile memory, is shared between the CPU 11 and FCU 41. In normal operation mode, the multiplexer 16 couples the CPU 11 and the RAM 13. In test mode, the multiplexer 16 couples the FCU 41 and the RAM 13. When the MCU 200 operates in normal operation mode, the RAM 13 is used to store the user program 25. After storing the user program 25 into the RAM 13, the MCU 200 activates the CPU 11. The CPU 11 starts fetching instructions from the RAM 13 and sequentially executes the instructions. When the MCU 200 operates in test mode, the RAM 13 is used to store test firmware 26. In the test mode operation, the multiplexer 16 couples the FCU 41 to the RAM 13, which causes the FPCC 48 to start fetching instructions from the RAM 13 and sequentially execute the instructions, thereby conducting a test on the flash memory 15.

When the MCU 200 operates in normal operation mode, the FPCC 48 functions as a bus master of the FBSC 44. However, when the FPCC 48 is not activated, the FACI 51 functions as a bus master of the FBSC 44.

FIG. 4 indicates main units that execute respective programs. As shown in FIG. 4, the CPU 11 reads the user program 25 from the RAM 13 to execute it in the normal operation mode. The FPCC 48 is coupled to the RAM 13 in the test mode and reads the test firmware 26 from the RAM 13 to execute it. Access to the flash memory 15 is made by causing the FPCC 48 to read the flash control program 27 from the ROM 49 and execute it.

Summary of First Embodiment

According to the MCU 200 in the first embodiment, when the MCU 200 operates in test mode, the FPCC 48 reads out test firmware and sequentially executes it to conduct a test on the flash memory 15. Therefore, development of CPU-independent test firmware can be achieved, which is easier than development of the test firmware in accordance with the CPU.

In addition, the MCU 200 of the first embodiment allows description of the test firmware in a specific language that meets the specifications of the FPCC 48. It is also possible to provide an object file to users after being assembled. In this case, since it is difficult for the users to decode the object file, the confidentiality of the know-how to test the flash memory can be ensured.

Since the MCU 200 of the first embodiment allows the FCU 41 to access the RAM 13 via the local bus 43, the FCU 41 can use the RAM 13 as a storage of the program that operates the FPCC 48 in the test mode. Therefore, there is no need to provide a RAM used only for storing the program that operates the FPCC 48, thereby reducing the circuitry area.

Second Embodiment

Figures 5, 6:
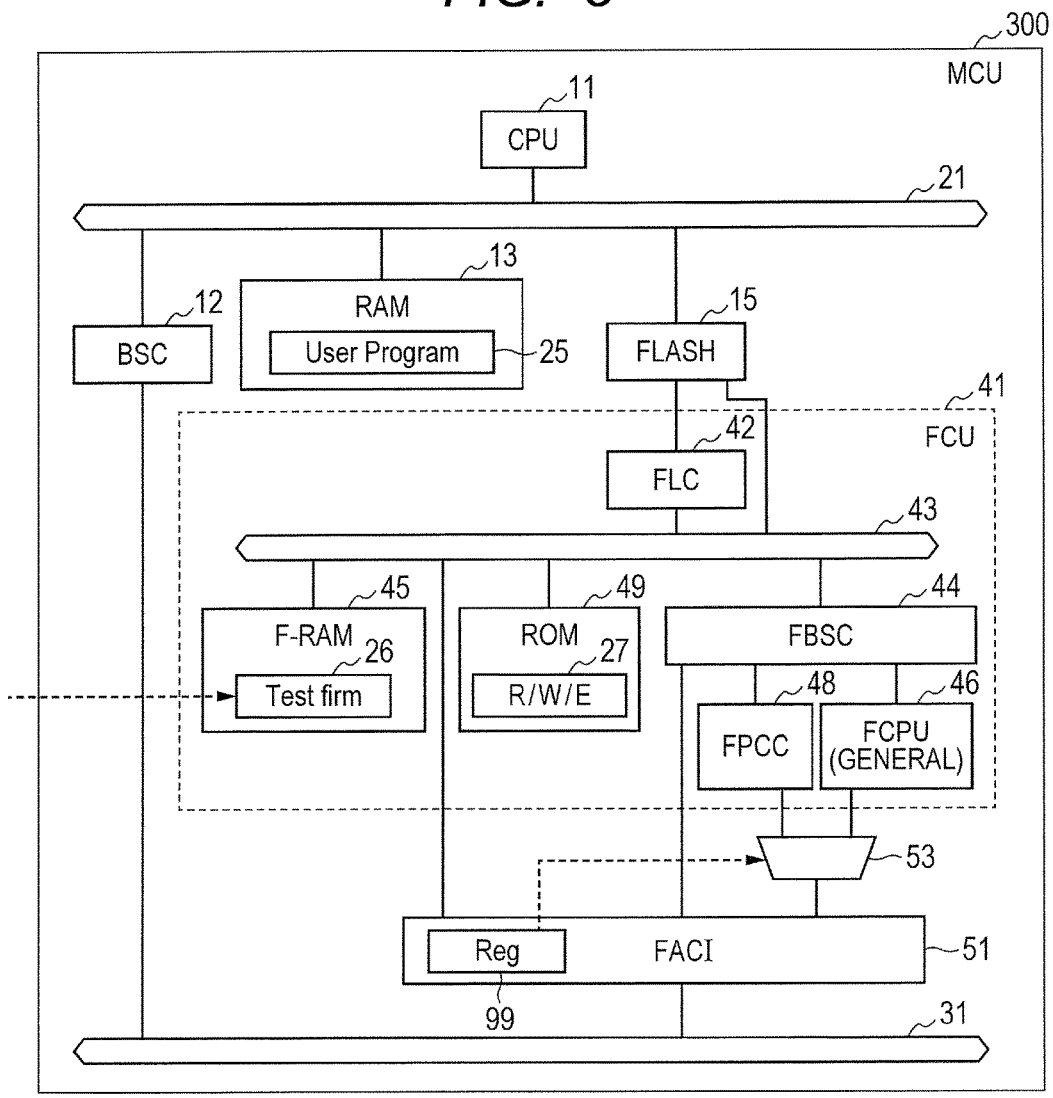
FIG. 5 is a block diagram showing the configuration of an MCU 300 which is a semiconductor device of the second embodiment.
FIG. 6 indicates main units that execute respective programs.

Referring to FIGS. 5 and 6, a semiconductor device of the second embodiment will be described. FIG. 5 is a block diagram showing the configuration of an MCU 300 which is a semiconductor device of the second embodiment.

As shown in FIG. 5, the MCU 300 includes an FCPU 46 and an FPCC 48 in an FCU 41, and a multiplexer 53 that switches between the FCPU 46 and FPCC 48 to couple to an FACI 51.

In comparison with the related art, when the MCU 300 of the second embodiment operates in normal operation mode, the multiplexer 53 couples the FPCC 48 and the FACI 51 so that the FPCC 48 writes or performs other operations to the flash memory 15 in accordance with a command issued by the CPU 11. The FACI 51 controls the switch operation of the multiplexer 53 according to whether the MCU 300 operates in normal operation mode or test mode.

When the MCU 300 operates in normal operation mode, the FCPU 46 is not activated, but it is activated by a command issued by the CPU 11 when the MCU 300 operates in test mode. The FCPU 46 acquires instructions from the test firmware 26 stored in the F-RAM 45 and sequentially executes the instructions to conduct a test on the flash memory 15.

Although the example of FIG. 5 illustrates that the flash control program 27 for controlling the operation of the FPCC 48 is stored in the ROM 49, the flash control program 27 can be stored in the F-RAM 45. The F-RAM 45 is a volatile memory used to store programs that control the operation of the FPCC 48 or FCPU 46. In the case where the F-RAM 45 stores the flash control program 27, the flash control program 27 is transferred to the F-RAM 45 before the FPCC 48 is activated. In this case, the flash control program 27 is configured to be written in a part of the storage region in the flash memory 15. In test mode, before the FCPU 46 is activated in test mode, the test firmware 26 is transferred to the F-RAM 45.

The RAM 13 is a general-purpose RAM used to store a user program 25. The CPU 11 starts fetching instructions from the RAM 13 upon startup and sequentially executes the instructions.

FIG. 6 indicates main units that execute respective programs. As shown in FIG. 6, in normal operation mode, the CPU 11 reads the user program 25 from the RAM 13 to execute it. In the test mode, the FCPU 46 reads the test firmware 26 from the F-RAM 45 to execute it. Access to the flash memory 15 is made by causing the FPCC 48 to read the flash control program 27 from the ROM 49 and execute it.

Summary of Second Embodiment

According to the MCU 300 in the second embodiment, when the MCU 300 operates in the test mode, the FCPU 46 reads test firmware and sequentially executes it to conduct a test on the flash memory 15. Therefore, development of the test firmware can be achieved without dependence on the CPU 11, which is easier than the development of the test firmware in accordance with the CPU 11.

In a case where the FCPU 46 in the MCU 300 is implemented by a general-purpose CPU, development of the test firmware can be made in a general language, thereby facilitating the development.

The MCU 300 uses a general-purpose CPU as the FCPU 46 and uses the FPCC 48 as a rewrite controller specifically designed to control write and erase operations to the flash memory 15. Decoupling one of the processors used to perform write or other operations to the flash memory 15 between the normal operation mode and test mode optimizes the write and erase characteristics of the flash memory 15, while flexibly conducting a test on the flash memory 15.

Third Embodiment

Figures 7, 8:
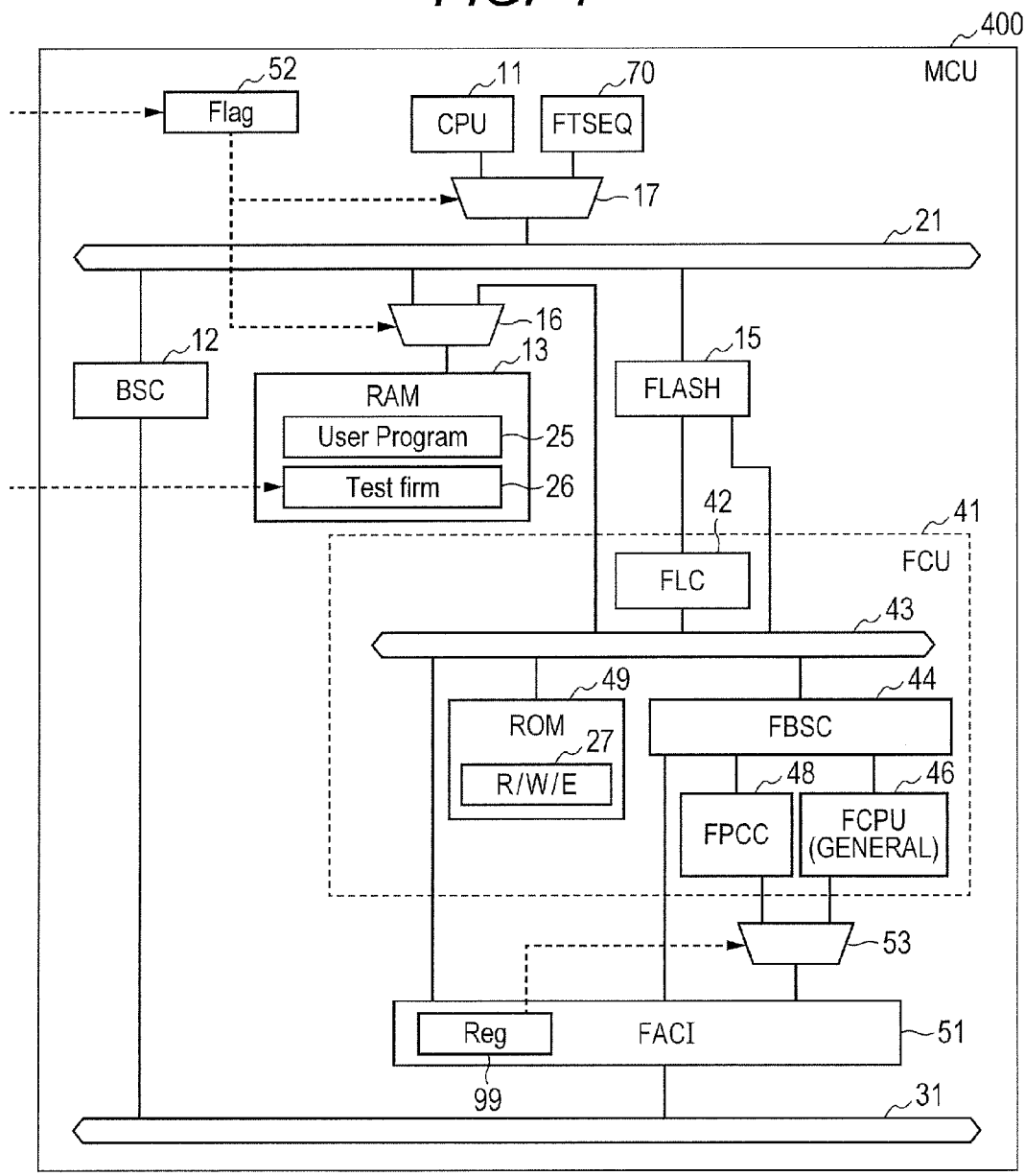
FIG. 7 is a block diagram showing the configuration of an MCU 400 which is a semiconductor device of the third embodiment.
FIG. 8 indicates main units that execute respective programs.

Referring to FIGS. 7 and 8, a semiconductor device of the third embodiment will be described. FIG. 7 is a block diagram showing the configuration of an MCU 400 which is a semiconductor device of the third embodiment.

As shown in FIG. 7, the MCU 400 is different from the MCU 100 of the first embodiment in that it includes an FCPU 46 and an FPCC 48 in an FCU 41. Similar to the MCU 300 of the second embodiment, when the MCU 400 operates in normal operation mode, the FPCC 48 performs write or other operations to a flash memory 15, while the FCPU 46 conducts a test on the flash memory 15 when the MCU 400 operates in test mode.

FIG. 8 indicates main units that execute respective programs. As shown in FIG. 8, a CPU 11 reads a user program 25 from a RAM 13 to execute it in the normal operation mode. The FCPU 46 reads out a test firmware 26 from an F-RAM 45 to execute it in the test mode. Access to the flash memory 15 is made by causing the FPCC 48 to read a flash control program 27 from a ROM 49 and execute it.

Summary of Third Embodiment

According to the MCU 400 in the third embodiment, when the MCU 400 operates in the test mode, the FCPU 46 reads test firmware and sequentially executes it to conduct a test on the flash memory 15. Therefore, development of the test firmware can be achieved without dependence on the CPU 11, which is easier than the development of the test firmware in accordance with the CPU 11.

Since the MCU 400 allows the FCU 41 to access the RAM 13 via the local bus 43, the FCU 41 can use the RAM 13 as a storage of the program that operates the FPCC 48 in the test mode. Therefore, there is no need to provide a RAM used only for storing the program that operates the FPCC 48, thereby reducing the circuitry area.

Fourth Embodiment

Figure 9:
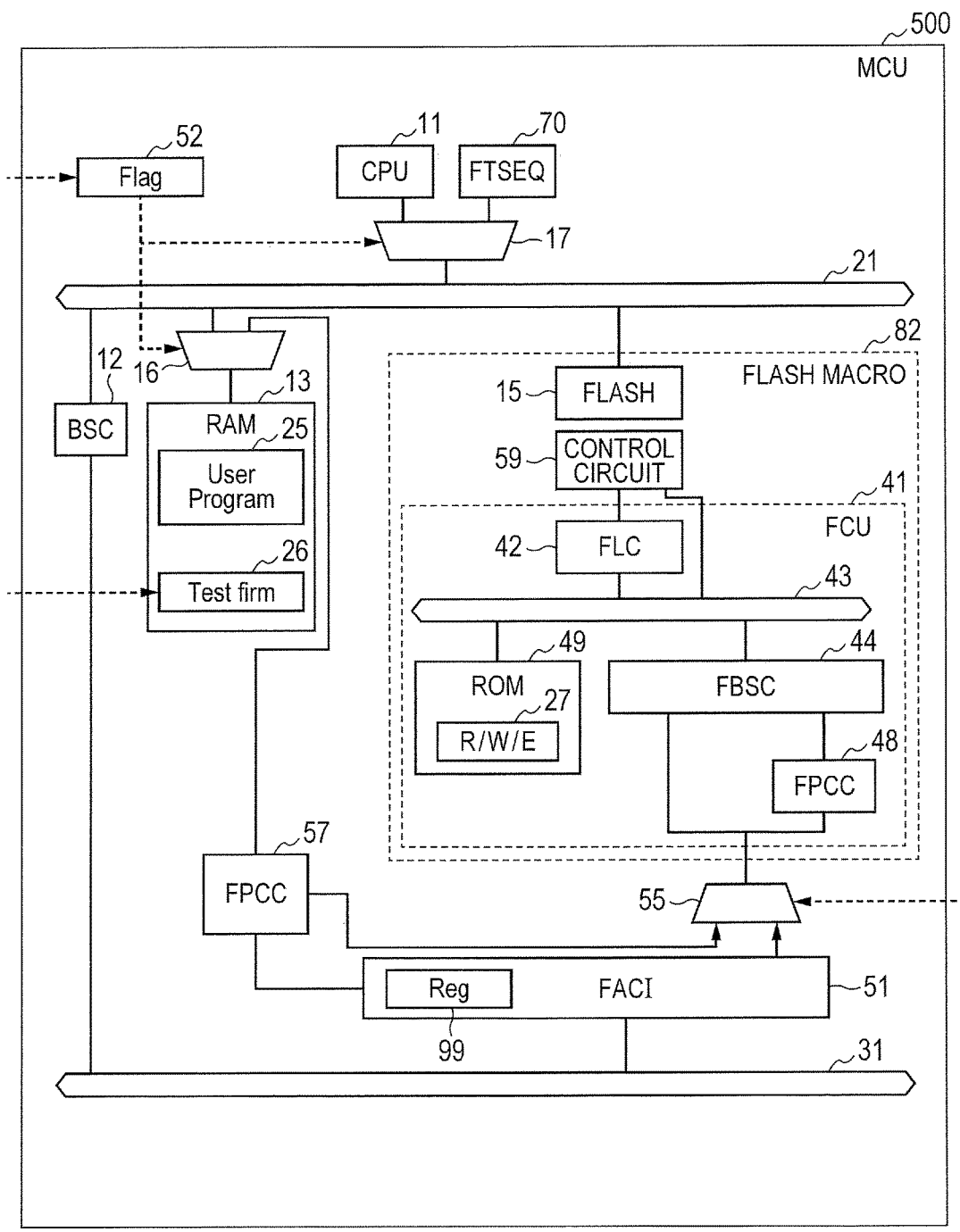
FIG. 9 is a block diagram showing the configuration of an MCU 500 which is a semiconductor device of the fourth embodiment.
Figures 10, 11:
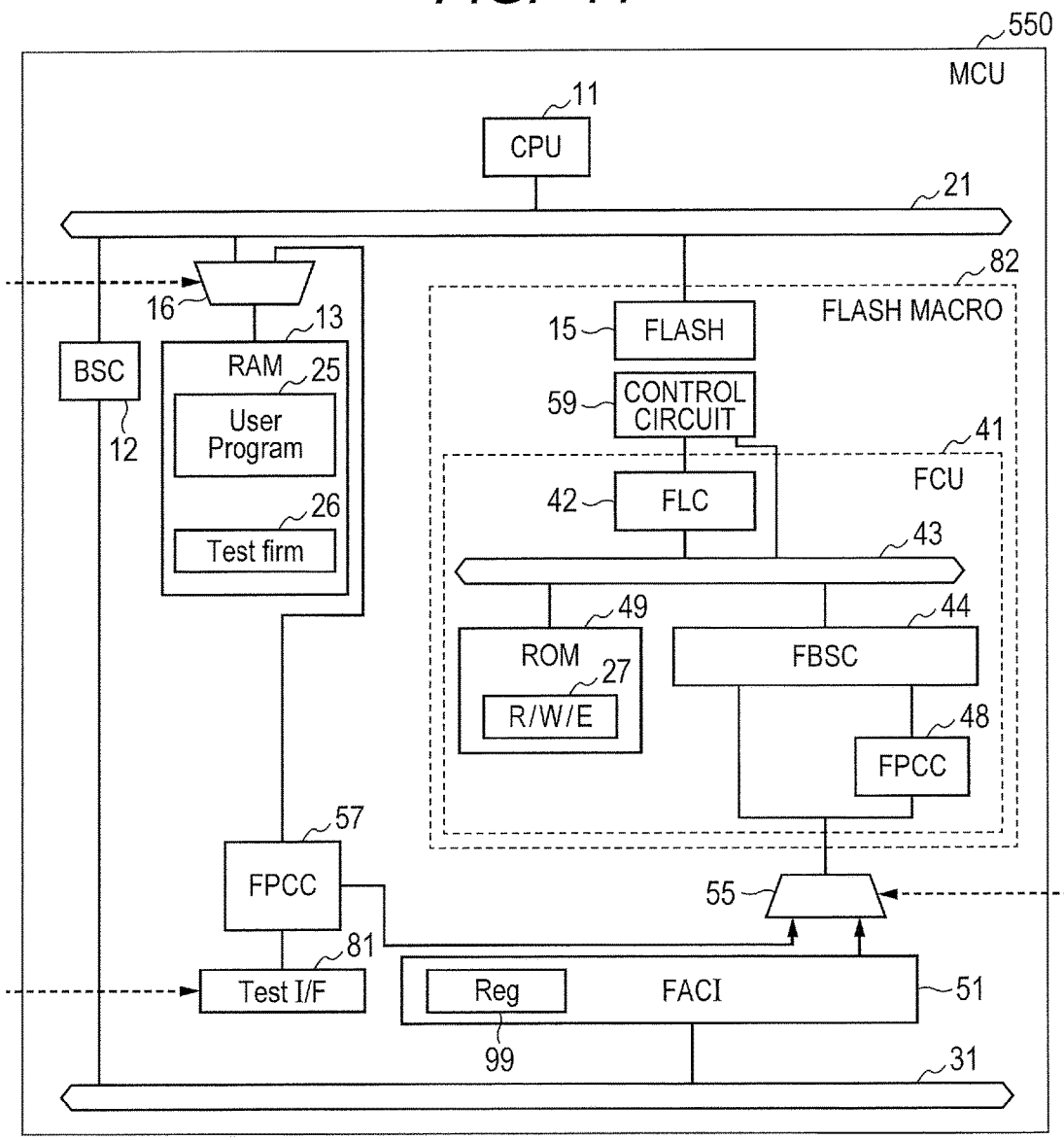
FIG. 10 indicates main units that execute respective programs.
FIG. 11 is a block diagram showing the configuration of an MCU 550 which is a semiconductor device of the first modification of the fourth embodiment.

Referring to FIGS. 9 and 10, a semiconductor device of the fourth embodiment will be described.

FIG. 9 is a block diagram showing the configuration of an MCU 500 which is a semiconductor device of the fourth embodiment.

FIG. 10 indicates main units that execute respective programs.

As shown in FIG. 9, the MCU 500 is different from the MCU 200 of the first embodiment in that it has an FCU 41 disposed in a flash macro 82. In addition, the FCU 41 includes a local bus 43 that is not coupled to a RAM 13 and FACI 51. A flash memory 15 includes a memory cell array in which nonvolatile memory cells, which hold information, are arranged in a matrix with a plurality of rows and columns. A control circuit 59 reads and writes information from/to the memory cell array of the flash memory 15. The control circuit includes a row decode circuit that decodes a row address to specify a memory cell to be accessed, a column decode circuit that decodes a column address, a write amplifier circuit that writes a memory cell selected based on the row address and column address, a sense amplifier circuit that reads information from the selected memory cell, and some other components.

In the MCU 500, an FPCC 48 is mounted inside the Flash macro 82 and an FPCC 57 is mounted outside the Flash macro 82. The FPCC 57 functions as a control core that controls processing when the MCU 500 operates in test mode. The FPCC 57 is activated upon receipt of a command from the CPU 11 via the FACI 51 in the test mode. A multiplexer 16 accepts a memory access request from the CPU 11 or FPCC 57 according to test mode or normal mode. In the test mode operation, the multiplexer 16 accepts a read request from the FPCC 57. The FPCC 57 starts fetching instructions stored in the RAM 13 in the test mode operation and sequentially executes the instructions to conduct a test on the flash memory 15. The FPCC 57 functioning as a test control core can also activate the FPCC 48 in the FCU 41.

Summary of Fourth Embodiment

According to the MCU 500 of the fourth embodiment, the programs used to operate the MCU 500 in test mode can be stored in a memory outside the Flash macro 82. In addition, the processor used to operate the MCU 500 in test mode can be disposed outside the Flash macro 82.

First Modification of Fourth Embodiment

FIG. 11 is a block diagram showing the configuration of an MCU 550 which is a semiconductor device of the first modification of the fourth embodiment.

Figures 12, 13:
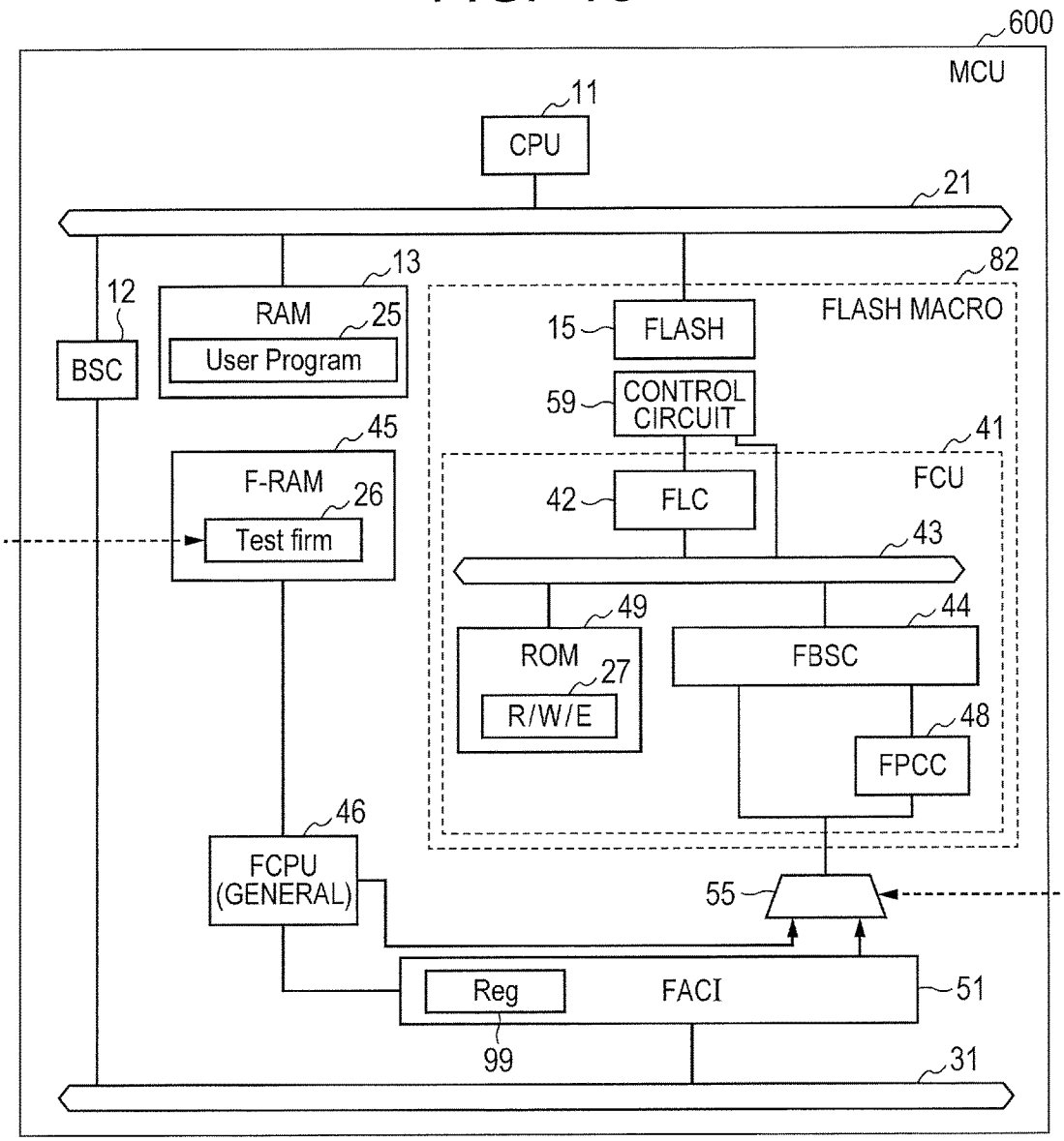
FIG. 12 indicates main units that execute respective programs.
FIG. 13 is a block diagram showing the configuration of an MCU 600 which is a semiconductor device of the fifth embodiment.

FIG. 12 indicates main units that execute respective programs.

A multiplexer 16 accepts a memory access request from a CPU 11 or an FPCC 57 according to test mode or normal mode. In test mode operation, a multiplexer 16 accepts a read request from the FPCC 57. In the first modification of the first embodiment, the FPCC 57 is activated upon receipt of a signal input through a test interface (Test I/F) 81 from an external device (tester).

Second Modification of Fourth Embodiment

The MCU 500, which is a semiconductor device of the fourth embodiment, in FIG. 9 has an FPCC 57 mounted outside a Flash macro 82; however, the FPCC 57 can be replaced with an FCPU 46, which is a general-purpose processor. In short, the general-purpose FCPU 46 that is disposed outside the Flash macro 82 can be used to read test firmware 26 and sequentially execute it to conduct a test on the flash memory 15.

Third Modification of Fourth Embodiment

The MCU 550, which is a semiconductor device of the first modification of the fourth embodiment, in FIG. 11 has an FPCC 57 mounted outside a Flash macro 82; however, the FPCC 57 can be replaced with a FCPU 46, which is a general-purpose processor. In short, the general-purpose FCPU 46 that is disposed outside the Flash macro 82 can be used to read test firmware 26 and sequentially execute it to conduct a test on the flash memory 15.

Fifth Embodiment

Figures 14, 15:
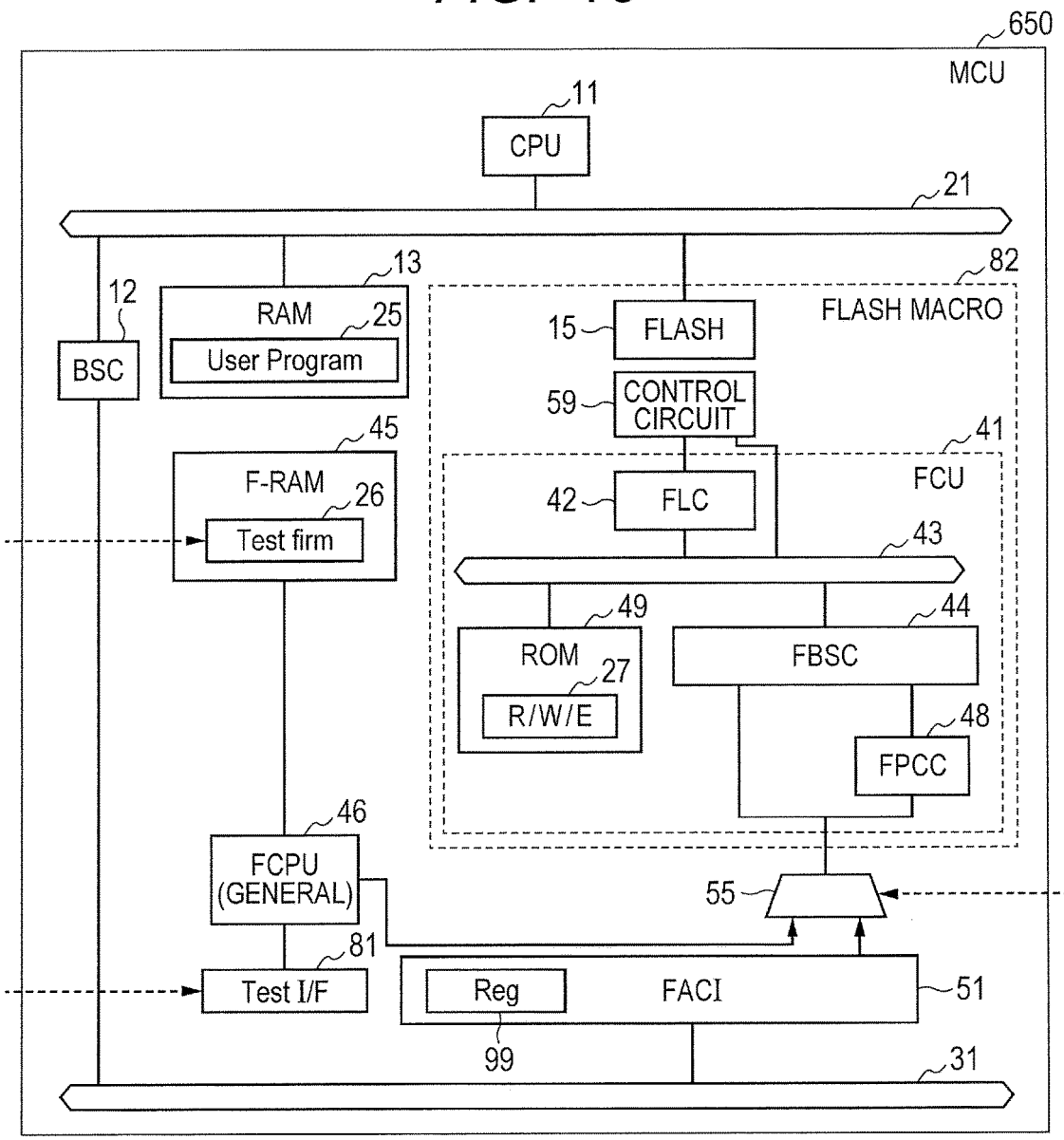
FIG. 14 indicates main units that execute respective programs.
FIG. 15 is a block diagram showing the configuration of an MCU 650 which is a semiconductor device of a modification of the fifth embodiment.

Referring to FIGS. 13 and 14, a semiconductor device of the fifth embodiment will be described.

FIG. 13 is a block diagram showing the configuration of an MCU 600 which is a semiconductor device of the fifth embodiment.

FIG. 14 indicates main units that execute respective programs.

As shown in FIG. 13, an MCU 600 is different from the MCU 300 of the second embodiment in that it has an FCU 41 disposed inside a flash macro 82. In addition, the FCU 41 includes a local bus 43 that is not coupled to a RAM 13 and an FACI 51.

An FCPU 46 and F-RAM 45 are disposed outside the Flash macro 82. The FCPU 46 is activated upon receipt of a command from the CPU 11 via the FACI 51 in test mode operation. A multiplexer 55 outputs a signal from the FACI 51 or FCPU 46 to the FCU 41 according to test mode or normal mode. In the test mode operation, the multiplexer 55 outputs the signal from the FCPU 46 to the FCU 41.

The FCPU 46 also can activate an FPCC 48 inside the FCU 41. The FCPU 46 reads test firmware 26 from the F-RAM 45, starts fetching instructions from the F-RAM 45, and sequentially executes the instructions to conduct a test on the flash memory 15.

Summary of Fifth Embodiment

According to the MCU 600 of the fifth embodiment, the programs used to operate the MCU 600 in test mode can be stored in a memory outside the Flash macro 82. In addition, the processor used to operate the MCU 600 in test mode can be disposed outside the Flash macro 82.

Modification of Fifth Embodiment

FIG. 15 is a block diagram showing the configuration of an MCU 650 which is a semiconductor device of a modification of the fifth embodiment.

FIG. 16 indicates main units that execute respective programs.

In test mode operation, the FCPU 46 is activated upon receipt of a signal input through a test interface (Test I/F) 81 from an external device (tester), but not from the CPU 11.

It should be further understood by those skilled in the art that although the foregoing description has been made on embodiments of the invention, the invention is not limited thereto and various changes and modifications may be made without departing from the spirit of the invention and the scope of the appended claims.

It should be understood that the embodiments and modifications disclosed herein are illustrative and non-restrictive in every respect. The scope of the present invention is defined by the terms of the claims, rather than by the foregoing description, and is intended to include any modifications within the scope and meaning equivalent to the terms of the claims.

What is claimed is:

1. A semiconductor device, comprising:
a central processing unit (CPU);
a FLASH (rewritable nonvolatile) memory;
a random access memory (RAM);
a test sequencer;
a memory controller that controls write and erase operations to the FLASH memory;
a first multiplexer that couples a first bus with any one of the CPU and the test sequencer; and
a second multiplexer that couples the RAM with any one of the first bus and the memory controller,
wherein, in a normal operation mode, the RAM is coupled to the CPU via the first and second multiplexer, and the CPU controls the FLASH memory by sending commands to the memory controller via the first bus, and
wherein, in a test mode, the RAM couples to the memory controller via the second multiplexer, and the test sequencer controls the FLASH memory by sending commands to the memory controller via the first bus.

2. The semiconductor device according to claim 1,
wherein a user program and a test firmware is stored in the RAM,
wherein the CPU sends commands based on the user program in the normal operating mode, and
wherein the test sequencer sends commands based on the firmware in the test mode.

3. The semiconductor device according to claim 1, further comprising a program customized controller that controls the FLASH memory, wherein the program customized controller tests the FLASH memory by reading out test firmware and sequentially executing instructions in the test firmware.

4. The semiconductor device according to claim 3, further comprising a second bus in the memory controller, wherein the program customized controller reads out the test firmware via the second bus.

5. The semiconductor device according to claim 1, further comprising a storage device storing a flag that indicates whether the semiconductor device is to operate in the normal operating mode or the test mode, wherein the first and second multiplexers determine connections based on the flag.

\* \* \* \* \*